United States Patent [19]

Shishido

[11] 4,050,325
[45] Sept. 27, 1977

[54] SPEED CHANGE GEAR APPARATUS FOR AN AUTOMOBILE TRANSMISSION

[75] Inventor: Yoshio Shishido, Toyota, Japan
[73] Assignee: Toyota Jidosha Kogyo Kabushiki Kaisha, Toyoto, Japan
[21] Appl. No.: 661,016
[22] Filed: Feb. 24, 1976
[30] Foreign Application Priority Data
   May 30, 1975  Japan ................................. 50-65559
[51] Int. Cl.² .......................... G05G 1/04; G05G 7/00
[52] U.S. Cl. ..................................... 74/473 R; 74/491
[58] Field of Search ..................... 74/473 R, 491, 523
[56] References Cited
   U.S. PATENT DOCUMENTS
   3,858,456  1/1975  Bahl et al. ............................ 74/491
   3,899,934  8/1975  Froumajou ...................... 74/473 X Primary Examiner—Allan D. Herrmann

[57] ABSTRACT

A speed change gear apparatus for an automobile transmission including a shift lever having its one end pivotally connected with one end of a control rod, the other end of which is connected with one end of a control shaft extending from a transmission through a joint; the apparatus comprising a pair of support members in the form of links of an oscillation isolating material, one end of the support links being rigidly or pivotally connected with a car body while their other end carry a shift lever housing which supports the shift lever in suspension in a pivotal manner, and a support rod disposed substantially in parallel relationship with the control rod, the support rod having its opposite ends pivotally connected with the shift lever housing and the transmission, respectively.

45 Claims, 10 Drawing Figures

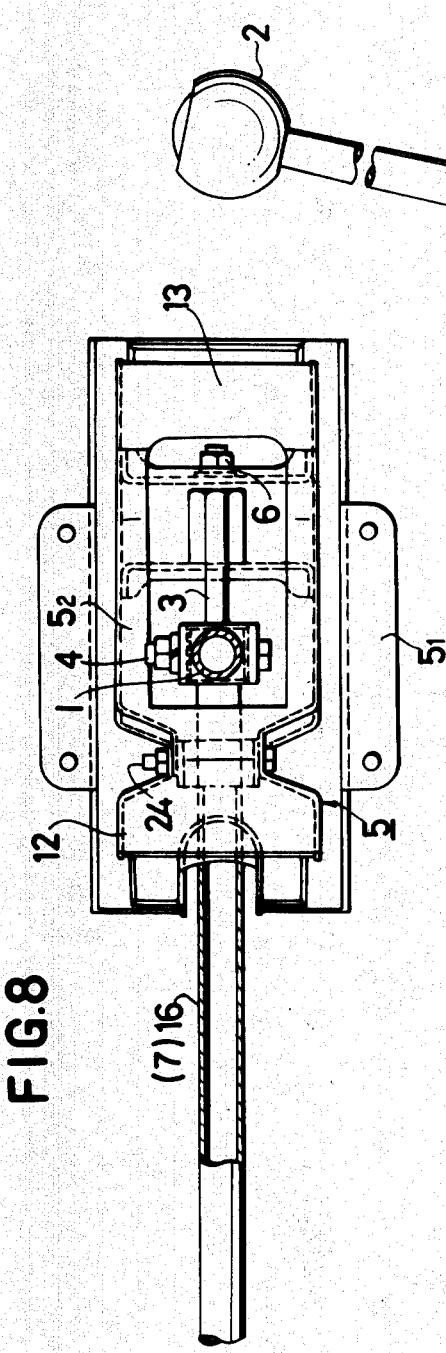
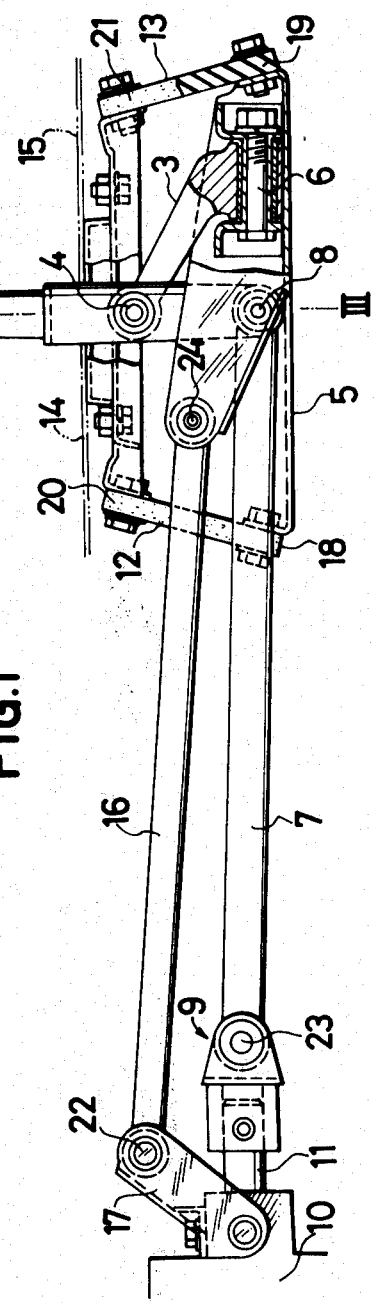
FIG.8
FIG.1

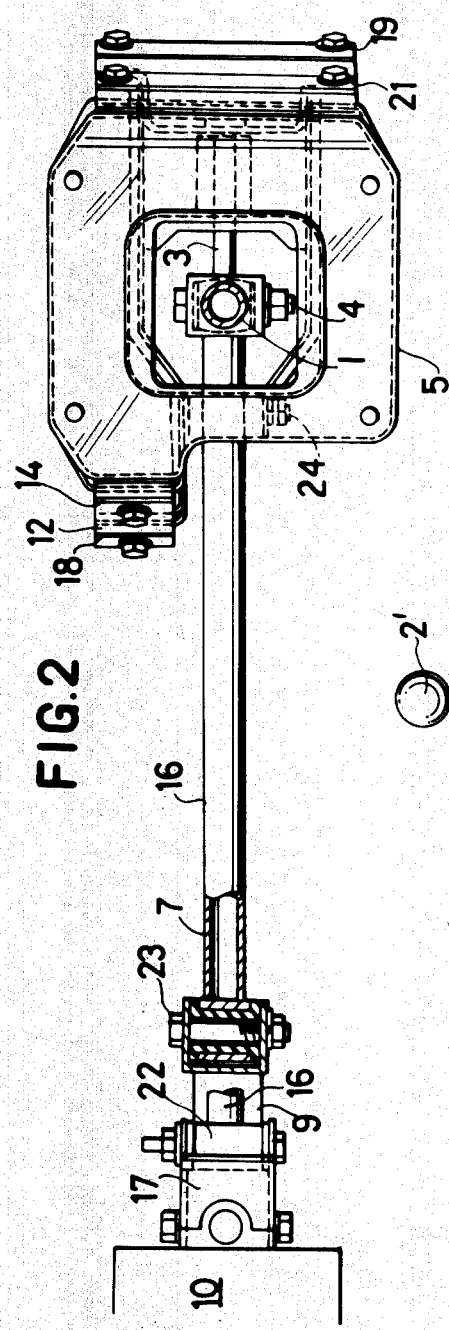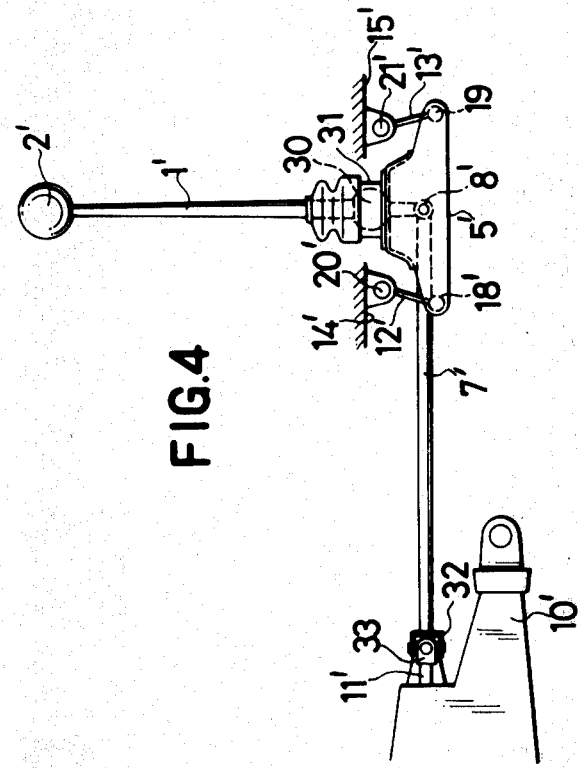

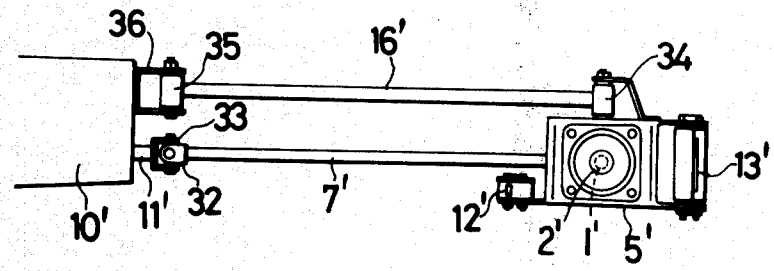
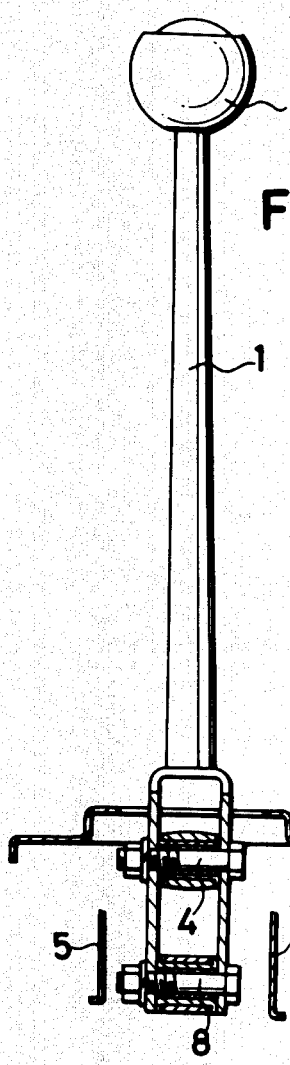
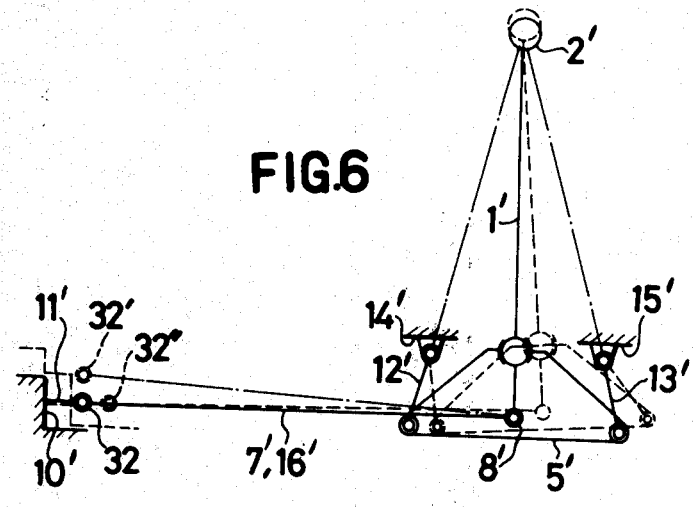

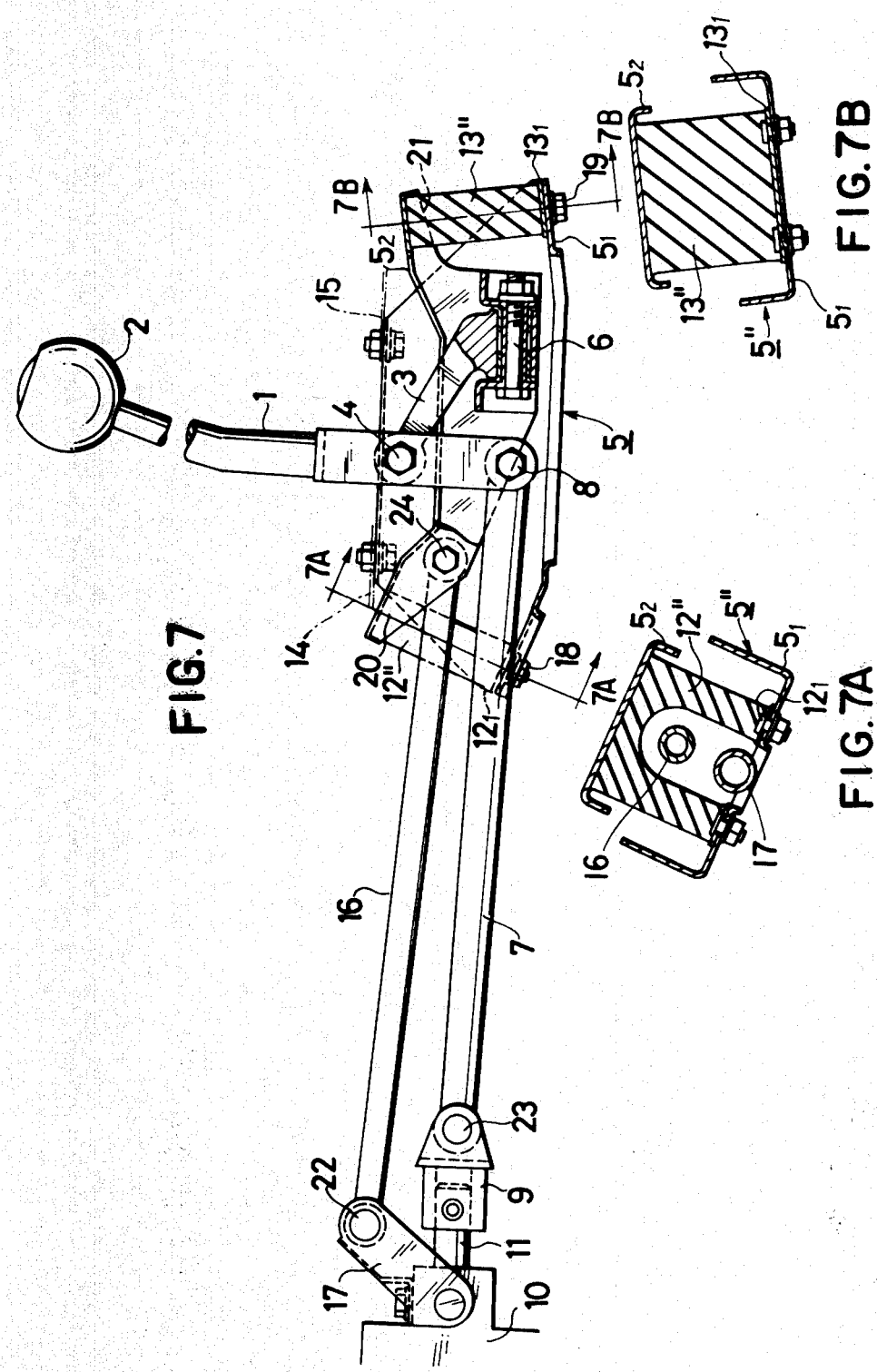

SPEED CHANGE GEAR APPARATUS FOR AN AUTOMOBILE TRANSMISSION

BACKGROUND OF THE INVENTION

The invention relates to a speed change gear apparatus for an automobile transmission.

An engine on an automobile is subject to oscillations either vertically, longitudinally or rotationally relative to a car body as a result of oscillations of the engine itself during its operation as well as accelerations and decelerations of the automobile, which oscillations may cause a failure of gear meshing engagement or may be imparted to a shift lever to produce an uncomfortable feeling to a driver.

Various mechanisms which are intended to prevent the oscillations of the shift lever from occurring have been proposed as exemplified by Japanese Patent Publications Nos. 39,408/1973, 40,205/1973, Japanese Utility Model Publication Nos. 40,203/1973, 43,525/1973 and 44,340/1973. In a conventional change gear apparatus for transmission, use is made of an oscillation isolating member such as rubber bushing on the opposite ends of a support rod in an attempt to prevent oscillations and noises from the engine system from being transmitted to the floor through a support rod, a shift lever housing and a support link, but these prior art structures have failed to provide a satisfactory oscillation isolating effect which assures an improved feeling during a shift operation. This gave rise to need for the interposition of additional isolating members between the support rod and the floor, thereby increasing the number of parts used, but still failing to provide an improved feeling during the operation of the shift lever.

SUMMARY OF THE INVENTION

It is an object of the invention to provide a transmission system of a novel construction capable of fully affording an oscillation isolating function without the need to increase the number of parts, by using oscillation isolating materials such as rubber, rubber containing a canvas layer, burlap, a spring to form a support member in the form of a link which carries both a shift lever and a shift lever housing.

According to the present invention, there is provided a speed change gear apparatus for an automobile transmission including a shift lever having its one end pivotally connected with one end of a control rod, the other end of which is connected with one end of a control shaft extending from a transmission through a joint; the apparatus comprising a pair of support links of an oscillation isolating material, one end of the support links being rigidly or pivotally connected with a car body while their other end carry a shift lever housing which supports the shift lever in suspension in a pivotal manner, and a support rod disposed substantially in parallel relationship with the control rod, the support rod having its opposite end pivotally connected with the shift lever housing and the transmission, respectively.

BRIEF DESCRIPTION OF THE DRAWINGS

For a better understanding of the invention, several embodiments thereof will be described with reference to the drawings, in which:

FIG. 1 is a front elevational view of one embodiment of the invention;

FIG. 2 is a top plan view partially in section of the apparatus shown in FIG. 1;

FIG. 3 is a section taken along the line III—III shown in FIG. 1;

FIG. 4 is a front elevational view of another embodiment of the invention;

FIG. 5 is a top plan view of the apparatus shown in FIG. 4;

FIG. 6 is a schematic view showing a displacement of the shift lever in response to a movement of the transmission of the embodiment shown in FIGS. 4 and 5;

FIG. 7 is a front elevational view partially in section of a further embodiment of the invention;

FIG. 7A is a sectional view taken along line 7A—7A of FIG. 7;

FIG. 7B is a sectional view taken along line 7B—7B of FIG. 7; and

FIG. 8 is a top plan view of the apparatus shown in FIG. 7.

DESCRIPTION OF THE PREFERRED EMBODIMENTS

Referring to the drawings, one embodiment of the invention is shown in a front elevational view in FIG. 1 and in a top plan view in FIG. 2. A shift lever 1 which is operated by an automobile driver terminates in a knob 2 at its top end. The shift lever 1 is of the type having separate fulcrums for a select and a shift operation. A support lever 3 has one end pivotally connected at 4 with the shift lever 1 and has its other end also pivotally connected with a shift lever housing 5, as shown at 6, thus carrying the shift lever 1. The pivotal connection 6 represents a fulcrum for lateral rotation of the shift lever 1 during a select operation while the pivotal connection 4 represents a fulcrum for rotation thereof in a vertical plan including the longitudinal axis of the automobile. The lower end of the shift lever 1 is pivotally connected at 8 with one end of a control rod 7, the other end of which is connected by a pin joint 9 with a control shaft 11 extending from a transmission 10, thus imparting a select and a shift force to the latter through the control rod 7, the pin joint 9 and the control shaft 11. The shift lever housing 5 is suspended from car body portions 14, 15 by a pair of support links 12, 13 which are formed of oscillation isolating material such as rubber, rubber containing canvas, burlap or plate spring. A support rod 16 is pivotally connected with a bracket 17 secured to the transmission 10 at its one end and with the shift lever housing 5 at its other end. In the present embodiment, the control rod 7 and the control shaft 11 lie in the same vertical plane as the support rod 16, and points 18, 19 of rigid connection between the pair of support links 12, 13 and the shift lever housing 5, as well as points 20, 21 of suspension from the car body are located such that the imaginary lines joining the points 18 and 20, and joining the points 19 and 21 both extend substantially through the center of the knob 2. A pivotal connection 22 between the bracket 17 and the support rod 16 and a pivotal connection 23 between the joint 9 and the control rod 7 as well as a pivotal connection 24 between the support rod 16 and the shift lever housing 5 each comprise an oscillation isolating bushing of a material such as rubber bushing, for example, thus absorbing or isolating and preventing oscillations and noises from the engine from influencing the shift lever knob. In this manner, any oscillation occurring in the transmission either vertically or longitudinally relative to the direction of travel of the automobile is prevented from being transmitted to the shift lever knob, avoiding the inconvenience such as a failure of gear meshing engagement. FIG. 3 is a section taken along the line III—III shown in FIG. 1. The pivotal connection 4, 6 and 8 each comprise a sliding bushing of a material such as nylon, Delrin or Oiless (trade marks), for example, since the feeling during a shift operation will be degraded if a resilient bushing such as rubber bushing is used for these pivotal connections 4, 6 and 8.

A second embodiment of the invention is shown in front elevation in FIG. 4 and in top view of FIG. 5. As before, the top end of the shift lever 1' is formed as the knob 2', but it is provided with a spherical formation 30 adjacent to its lower end which is rockably received in a bearing 31 which is formed in the shift lever housing 5'. The lower end of the shift lever 1' is pivotally connected at 8' with the one end of the control rod 7' as described previously. Similarly, the shift lever housing 5' is pivotally supported at 18', 19' by a pair of support links 12', 13', the other end of which are pivotally connected at 20', 21' with car body portions 14', 15'. The other end of the control rod 7' is connected with one end 33 of the control shaft 11' by a Hooke's universal joint 32. As before, the pair of imaginary lines which join the pivotal connections 18' and 20' and the pivotal connections 19' and 21' extend substantially through the center of the knob 2'. As indicated in FIG. 5, the support rod 16' is disposed in parallel relationship with and in the same horizontal plane as the control rod 7', and has its one end 34 pivotally connected with the shift lever housing 5' and its other end 35 rotatably mounted on a bracket 36 which is secured to the transmission 10'.

As a result of the above arrangement, it will be understood that an oscillation or movement of the transmission in a direction in the horizontal plane which is perpendicular to the length of the control rod 7' and the support rod 16' is prevented. For the purpose of considering oscillations occurring in the vertical direction as well as in the longitudinal direction of the automobile, reference is made to FIG. 6. It will be understood that when the Hooke's joint 32 between the control shaft 11' and the control rod 7' moves to an upper position 32', the point of pivotal connection between the support rod 16' and the transmission 10' also moves to its upper position while the point 8' of the pivotal connection between the shift lever 1' and the control rod 7' remains stationary, maintaining the position of the knob 2 unchanged, thus avoiding an uncomfortable vibrational effect to a driver. When the Hooke's joint 32 moves to a position 32", and hence when the transmission moves rearwardly, the control rod 7', the support rod 16', the support links 12', and 13' and the shift lever 1' also move to respective positions shown in broken lines, without causing any significant change in the position of the knob 2'. In this manner, influences upon the shift lever knob of oscillations occurring in the transmission either vertically or in the longitudinal direction are eliminated or minimized, prevented a failure of gear meshing engagement.

When the shift lever is rockably supported by the spherical bearing as in the present embodiment, the misalignment between the center of rocking motion of the shift lever and the center of rotation of control rod cause a rocking motion of the control rod during a select operation of the shift lever, i.e. when the shift lever is rocked laterally with respect to the direction of travel of the automobile, which rocking motion is absorbed by the combination of the control shaft and the Hooke's joint. If it is attempted to absorb such motion by the use of a rubber bushing, a highly flexible and soft rubber must be used, which however degrades the feeling by a driver during an operation of the shift lever.

A further embodiment of the invention is shown in FIG. 7 which is a front elevation view, partly in section. FIGS. 7A and 7B are sectional views taken, respectively, along lines 7A—7A and 7B—7B of FIG. 7. FIG. 8 shows a top plan view of this embodiment. As compared with the embodiment shown in FIG. 1 in which the shift lever housing 5 is suspended from car body portions 14, 15, the embodiment shown in FIG. 7 is of the type having the shift lever housing 5' directly mounted on a portion of the car body. In other respects, the embodiment shown in FIGS. 7, 7A, 7B and 8 is similar to that shown in FIG. 1. Specifically, the shift lever housing 5" is in two parts, an outer member $5_1$ which is channel-shaped in transverse section (FIGS. 7A and 7B) and an inner member $5_2$ which is invertedly channel-shaped in transverse section FIGS. 7A and 7B. The inner member $5_2$ is provided with the support lever 3 which carries the shift lever 1. The outer member $5_1$ is secured to car body portions 14, 15 as by bolting. The inner member $5_2$ is disposed on the outer member $5_1$ by means of the pair of support links 12", 13" which are adhesively secured to a pair of plates $12_1$, $13_1$, which are in turn screwed onto the inner and the outer member $5_2$, $5_1$ of the shift lever housing. To avoid interference with the support rod 16 and the control rod 17, the support link 12" is centrally formed with a space. The support rod 16 is pivotally mounted at 24 to the inner member $5_2$, in connection with the first embodiment.

What is claimed is:

1. A speed change gear apparatus for an automobile transmission including a shift lever having its one end pivotally connected with one end of a control rod, the other end of which is connected with one end of a control shaft extending from a transmission through a joint; the apparatus comprising a pair of support members of an oscillation isolating material, one end of the support members being connected with a car body while their other ends carry a shift lever housing which supports the shift lever in suspension in a pivotal manner, and a support rod disposed substantially in parallel relationship with the control rod, the support rod having its opposite ends pivotally connected with the shift lever housing and the transmission, respectively.

2. A speed change gear apparatus for an automobile transmission including a shift lever having its lower end pivotally connected with one end of a control rod, the other end of which is connected with a control shaft extending from a transmission through a joint; the apparatus comprising a pair of support members of an oscillation isolating material, one end of the support members being pivotally connected with a car body while their other ends carry a shift lever housing which supports the shift lever in suspension in a pivotal manner, the location of the pivotal connections of the support members with the car body and with the shift lever housing being chosen such that each imaginary line joining the pivotal connections of each support member with the car body and with the shift lever housing extends substantially through the end of the shift lever, and a support rod disposed substantially in parallel relationship with the control rod, the opposite ends of the support rod being pivotally connected with the shift lever housing and the transmission, respectively.

3. A speed change gear apparatus for an automobile transmission according to claim 2, wherein said shift lever housing is suspended from the car body directly with said support members.

4. A speed change gear apparatus for an automobile transmission according to claim 2, wherein said shift lever housing is comprised of an outer member which is fixed to the car body and an inner member which is provided with a support lever to support said shift lever and said shift lever is suspended from the car body by mounting said inner member by means of said support links which are mounted on said outer member.

5. A speed change gear apparatus for an automobile transmission according to claim 2, wherein said support rod is provided above said control rod.

6. A speed change gear apparatus for an automobile transmission according to claim 2, wherein said support rod is provided at the side of said control rod.

7. A speed change gear apparatus for an automobile transmission according to claim 2, wherein said support members are made of rubber.

8. A speed change gear apparatus for an automobile transmission according to claim 2, wherein said support members are made of rubber containing canvas.

9. A speed change gear apparatus for an automobile transmission according to claim 2, wherein said support members are made of burlap.

10. A speed change gear apparatus for an automobile transmission according to claim 2, wherein said support members are made of plate spring.

11. A speed change gear apparatus for an automobile transmission according to claim 2 wherein the end of the shift lever through which passes each imaginary line is provided with a knob.

12. A speed change gear apparatus for an automobile transmission as defined in claim 1 wherein said one end of the support members is rigidly connected with the car body.

13. A speed change gear apparatus for an automobile transmission as defined in claim 12, wherein the locations of the rigid connections of the support members with the car body and with the shift lever housing are chosen such that each imaginary line joining the rigid connections of each support member with the car body and with the shift lever housing extends substantially through the shift lever.

14. A speed change gear apparatus for an automobile transmission as defined in claim 13, wherein the pair of support members are rigidly connected with the car body and the shift lever housing, respectively, by means of bolting.

15. A speed change gear apparatus for an automobile transmission as defined in claim 14, wherein the shape of said support members is such that they may easily bend in a direction of the axis of the control rod.

16. A speed change gear apparatus for an automobile transmission as defined in claim 15, wherein the support members are of plate shape.

17. A speed change gear apparatus for an automobile transmission as defined in claim 16, wherein the shift lever is positioned in an approximately middle vertical plane between the pair of support members.

18. A speed change gear apparatus for an automobile transmission as claimed in claim 12, wherein the control rod is positioned beneath the support rod.

19. A speed change gear apparatus for an automobile transmission as defined in claim 13, wherein the control rod is positioned beneath the support rod.

20. A speed change gear apparatus for an automobile transmission as defined in claim 14, wherein the control rod is positioned beneath the support rod.

21. A speed change gear apparatus for an automobile transmission as defined in claim 15, wherein the control rod is positioned beneath the support rod.

22. A speed change gear apparatus for an automobile transmission as defined in claim 16, wherein the control rod is positioned beneath the support rod.

23. A speed change gear apparatus for an automobile transmission as defined in claim 17, wherein the control is positioned beneath the support rod.

24. A speed change gear apparatus for an automobile transmission as defined in claim 23, wherein the shift lever is supported by one end of a support lever the other end of which is pivotally connected with the shift lever housing.

25. A speed change gear apparatus for an automobile transmission as defined in claim 24, wherein the pivotal connection between the support rod and the shift lever housing is positioned in the approximately middle horizontal plane between the pivotal connection of the shift lever housing with the control rod and the pivotal connection of the shift lever with the support lever.

26. A speed change gear apparatus for an automobile transmission according to claim 25, wherein the shift lever housing is suspended from the car body directly with the support members.

27. A speed change gear apparatus for an automobile transmission according to claim 12, wherein said shift lever housing includes an outer member which is fixed to the car body and an inner member which is provided with a support lever to support the shift lever and the shift lever is suspended from the car body by mounting the inner member by means of the support members which are mounted on the outer member.

28. A speed change gear apparatus for an automobile transmission according to claim 13, wherein the shift lever housing includes an outer member which is fixed to the car body and an inner member which is provided with a support lever to support said shift lever and said shift lever is suspended from the car body by mounting said inner member by means of said support members which are mounted on said outer member.

29. A speed change gear apparatus for an automobile transmission according to claim 14, wherein the shift lever housing includes an outer member which is fixed to the car body and an inner member which is provided with a support lever to support said shift lever and said shift lever is suspended from the car body by mounting said inner member by means of said support members which are mounted on said outer member.

30. A speed change gear apparatus for an automobile transmission according to claim 15, wherein said shift lever housing includes an outer member which is fixed to the car body and an inner member which is provided with a support lever to support said shift lever and said shift lever is suspended from the car body by mounting said inner member by means of said support members which are mounted on said outer member.

31. A speed change gear apparatus for an automobile transmission according to claim 16, wherein said shift lever housing includes an outer member which is fixed to the car body and an inner member which is provided with a support lever to support said shift lever and said shift lever is suspended from the car body by mounting said inner member by means of said support members which are mounted on said outer member.

32. A speed change gear apparatus for an automobile transmission according to claim 17, wherein said shift lever housing includes an outer member which is fixed to the car body and an inner member which is provided with a support lever to support said shift lever and said shift lever is suspended from the car body by mounting said inner member by means of said support members which are mounted on said outer member.

33. A speed change gear apparatus for an automobile transmission according to claim 18, wherein said shift lever housing includes an outer member which is fixed to the car body and an inner member which is provided with a support lever to support said shift lever and said shift lever is suspended from the car body by mounting said inner member by means of said support members which are mounted on said outer member.

34. A speed change gear apparatus for an automobile transmission according to claim 19 wherein said shift lever housing includes an outer member which is fixed to the car body and an inner member which is provided with a support lever to support said shift lever and said shift lever is suspended from the car body by mounting said inner member by means of said support members which are mounted on said outer member.

35. A speed change gear apparatus for an automobile transmission according to claim 20 wherein said shift lever housing includes an outer member which is fixed to the car body and an inner member which is provided with a support lever to support said shift lever and said shift lever is suspended from the car body by mounting said inner member by means of said support members which are mounted on said outer member.

36. A speed change gear apparatus for an automobile transmission according to claim 21, wherein said shift lever housing includes an outer member which is fixed to the car body and an inner member which is provided with a support lever to support said shift lever and said shift lever is suspended from the car body by mounting said inner member by means of said support members which are mounted on said outer member.

37. A speed change gear apparatus for an automobile transmission according to claim 22, wherein said shift lever housing includes an outer member which is fixed to the car body and an inner member which is provided with a support lever to support said shift lever and said shift lever is suspended from the car by mounting said inner member by means of said support members which are mounted on said outer member.

38. A speed change gear apparatus for an automobile transmission according to claim 23 wherein said shift lever housing includes an outer member which is fixed to the car body and an inner member which is provided with a support lever to support said shift lever and said shift lever is suspended from the car body by mounting said inner member by means of said support members which are mounted on said outer member.

39. A speed change gear apparatus for an automobile transmission according to claim 24, wherein said shift lever housing includes an outer member which is fixed to the car body and an inner member which is provided with a support lever to support said shift lever and said shift lever is suspended from the car body by mounting said inner member by means of said support members which are mounted on said outer member.

40. A speed change gear apparatus for an automobile transmission as defined in claim 25, wherein said shift lever housing includes an outer member which is fixed to the car body and an inner member which is provided with a support lever to support said shift lever and said shift lever is suspended from the car body by mounting said inner member by means of said support members which are mounted on said outer member.

41. A speed change gear apparatus for an automobile transmission as defined in claim 12, wherein said support members are made of rubber.

42. A speed change gear apparatus for an automobile transmission as defined in claim 1, wherein said one end of the support members is pivotally connected with the car body.

43. A speed change gear apparatus for an automobile transmission as defined in claim 42, wherein the locations of the pivotal connections of the support members with the car body and with the shift lever housing are chosen such that each imaginary line joining the pivotal connections of each support member with the car body and with the shift lever housing extends substantially through the shift lever.

44. A speed change gear apparatus for an automobile transmission as defined in claim 43, wherein the shift lever is positioned in an approximately middle vertical plane between the pair of support members.

45. A speed change gear apparatus for an automobile transmission as defined in claim 44, wherein the shift lever is supported by one end of a support lever the other end of which is pivotally connected with the shift lever housing, the pivotal connection of the support rod with the shift lever housing being positioned in the approximately middle horizontal plane between the pivotal connection of the shift lever housing with the control rod and the pivotal connection of the shift lever with the support lever.

* * * * *